United States Patent
Hardin et al.

(10) Patent No.: US 10,550,291 B2
(45) Date of Patent: Feb. 4, 2020

(54) CORE-SHELL, OXIDATION-RESISTANT, ELECTRICALLY CONDUCTING PARTICLES FOR LOW TEMPERATURE CONDUCTIVE APPLICATIONS

(71) Applicant: Hitachi Chemical Co., Ltd., Tokyo (JP)

(72) Inventors: Brian E. Hardin, San Carlos, CA (US); Stephen T. Connor, San Francisco, CA (US); Craig H. Peters, Belmont, CA (US)

(73) Assignee: Hitachi Chemical Co., Ltd., Tokyo (JP)

(*) Notice: Subject to any disclaimer, the term of this patent is extended or adjusted under 35 U.S.C. 154(b) by 0 days.

(21) Appl. No.: 15/243,847

(22) Filed: Aug. 22, 2016

(65) Prior Publication Data

US 2017/0058152 A1    Mar. 2, 2017

Related U.S. Application Data

(60) Provisional application No. 62/377,261, filed on Aug. 19, 2016, provisional application No. 62/209,545, filed on Aug. 25, 2015.

(51) Int. Cl.
*H01B 1/22* (2006.01)
*C09J 9/00* (2006.01)
(Continued)

(52) U.S. Cl.
CPC . *C09J 9/02* (2013.01); *C09J 7/10* (2018.01); *C09J 11/04* (2013.01); *H01B 1/22* (2013.01);
(Continued)

(58) Field of Classification Search
CPC ..... C09J 9/02; C09J 7/00; C09J 11/04; C08K 7/06; C08K 9/02; H01B 1/22; H01B 1/02
(Continued)

(56) References Cited

U.S. PATENT DOCUMENTS

| 598,341 A | 2/1898 | Hammond |
|---|---|---|
| 1,993,490 A | 3/1935 | Friedrich |

(Continued)

FOREIGN PATENT DOCUMENTS

| DE | 102011104396 A1 | 12/2012 |
|---|---|---|
| EP | 1732137 B1 | 10/2011 |

(Continued)

OTHER PUBLICATIONS

International Search Report and Written Opinion for International application No. PCT/US16/48097 dated Dec. 28, 2016.

(Continued)

*Primary Examiner* — Mark Kopec
(74) *Attorney, Agent, or Firm* — R'Sue Popwich Caron

(57) ABSTRACT

Oxidation-resistant electrically-conductive metal particles (ORCMP) are disclosed. ORCMPs are comprised of a base-metal core, an oxidation-resistant first shell, and an optional conductive second shell. ORCMPs are low cost alternatives to silver particles in metal fillers for low-temperature, electrically-conductive adhesives. Adhesives including ORCMPs, organic vehicles, and optional conductive metal particles such as silver were formulated to yield conductive films upon curing at low temperatures. Such films can be used in many electronic devices where low-temperature, low cost films are needed.

27 Claims, 2 Drawing Sheets

(51) Int. Cl.
*C09J 9/02* (2006.01)
*C09J 11/04* (2006.01)
*C09J 7/10* (2018.01)
C09J 163/00 (2006.01)
C08K 7/06 (2006.01)
C08K 9/02 (2006.01)
C08K 3/22 (2006.01)
C08K 3/08 (2006.01)

(52) U.S. Cl.
CPC .............. *C08K 7/06* (2013.01); *C08K 9/02* (2013.01); *C08K 2003/0806* (2013.01); *C08K 2003/2286* (2013.01); *C08K 2003/2293* (2013.01); *C08K 2201/001* (2013.01); *C08K 2201/003* (2013.01); *C09J 163/00* (2013.01); *C09J 2201/602* (2013.01); *C09J 2203/326* (2013.01); *C09J 2205/102* (2013.01); *C09J 2463/00* (2013.01)

(58) Field of Classification Search
USPC .......................................................... 252/500
See application file for complete search history.

(56) References Cited

U.S. PATENT DOCUMENTS

| | | |
|---|---|---|
| 2,580,773 A | 1/1952 | Heiman |
| 2,662,831 A | 12/1953 | R |
| 2,852,366 A | 9/1958 | Jenkins |
| 3,489,657 A | 1/1970 | R et al. |
| 3,744,121 A | 7/1973 | Nagano et al. |
| 3,909,209 A | 9/1975 | Kruper et al. |
| 3,930,093 A | 12/1975 | Short |
| 3,949,118 A | 4/1976 | Nagano et al. |
| 4,001,146 A | 1/1977 | Horowitz |
| 4,045,245 A | 8/1977 | Coleman et al. |
| 4,122,232 A | 10/1978 | Kuo |
| 4,130,854 A | 12/1978 | Hertz |
| 4,137,361 A | 1/1979 | Deffeyes et al. |
| 4,347,165 A | 8/1982 | Matheson |
| 4,397,812 A | 8/1983 | Mallory |
| 4,485,153 A | 11/1984 | Janikowski et al. |
| 4,492,812 A | 1/1985 | Lindmayer |
| 4,635,701 A | 1/1987 | Sare et al. |
| 4,800,065 A | 1/1989 | Christodoulou et al. |
| 4,833,040 A | 5/1989 | Fishman |
| 4,873,148 A | 10/1989 | Kemp et al. |
| 5,118,362 A | 6/1992 | Angelo et al. |
| 5,162,062 A | 11/1992 | Carroll et al. |
| 5,178,685 A | 1/1993 | Borenstein et al. |
| 5,279,682 A | 1/1994 | Wald et al. |
| 5,320,684 A | 6/1994 | Amick et al. |
| 5,645,765 A | 7/1997 | Asada et al. |
| 5,714,238 A | 2/1998 | Komagata et al. |
| 5,840,432 A | 11/1998 | Hirai et al. |
| 6,059,952 A | 5/2000 | Kang et al. |
| 6,156,237 A | 12/2000 | Kubota et al. |
| 6,180,869 B1 | 1/2001 | Meier et al. |
| 6,262,359 B1 | 7/2001 | Meier et al. |
| 6,372,158 B1 | 4/2002 | Hashimoto et al. |
| 6,632,730 B1 | 10/2003 | Meier et al. |
| 6,710,239 B2 | 3/2004 | Tanaka |
| 6,770,369 B1 | 9/2004 | Oyamada |
| 7,384,447 B2 | 6/2008 | Kodas et al. |
| 7,470,416 B2 | 12/2008 | Ishida |
| 8,093,491 B2 | 1/2012 | Sridharan et al. |
| 8,597,397 B2 | 12/2013 | Kunze et al. |
| 8,610,289 B2 | 12/2013 | Wildpanner et al. |
| 8,696,946 B2 | 4/2014 | Matsumoto et al. |
| 8,697,476 B2 | 4/2014 | Borland |
| 8,748,327 B2 | 6/2014 | Park et al. |
| 8,884,277 B2 | 11/2014 | Neidert et al. |
| 9,275,772 B2 | 3/2016 | Pham et al. |
| 9,698,283 B2* | 7/2017 | Hardin .............. H01L 31/02242 |
| 2004/0155227 A1 | 8/2004 | Bechtloff et al. |
| 2006/0022173 A1 | 2/2006 | Yamakawa et al. |
| 2006/0042681 A1 | 3/2006 | Korman |
| 2006/0289055 A1 | 12/2006 | Sridharan et al. |
| 2007/0056403 A1 | 3/2007 | Kubota |
| 2008/0143785 A1 | 6/2008 | Houjou |
| 2008/0230119 A1 | 9/2008 | Akimoto |
| 2009/0211626 A1 | 8/2009 | Akimoto |
| 2010/0120191 A1 | 5/2010 | Borden et al. |
| 2010/0163101 A1 | 7/2010 | Kumar et al. |
| 2010/0227433 A1 | 9/2010 | Konno |
| 2010/0243048 A1 | 9/2010 | Laudisio et al. |
| 2010/0269893 A1 | 10/2010 | Prince et al. |
| 2011/0192457 A1 | 8/2011 | Nakayama et al. |
| 2011/0197960 A1 | 8/2011 | Pham et al. |
| 2011/0223713 A1 | 9/2011 | Akimoto |
| 2011/0303898 A1 | 12/2011 | Tian et al. |
| 2011/0315217 A1 | 12/2011 | Gee |
| 2012/0082948 A1 | 4/2012 | Huh et al. |
| 2012/0085401 A1 | 4/2012 | Borland et al. |
| 2012/0279563 A1 | 11/2012 | Meier et al. |
| 2013/0098431 A1 | 4/2013 | Chen et al. |
| 2013/0248777 A1 | 9/2013 | Sgriccia et al. |
| 2013/0256606 A1* | 10/2013 | Matsumoto ............ H01R 13/03 252/513 |
| 2013/0270489 A1 | 10/2013 | Wang et al. |
| 2013/0277624 A1 | 10/2013 | Yang et al. |
| 2013/0284250 A1 | 10/2013 | Hang et al. |
| 2013/0319496 A1 | 12/2013 | Karpowich et al. |
| 2014/0020743 A1 | 1/2014 | Konno |
| 2014/0026953 A1 | 1/2014 | Zhang et al. |
| 2014/0048116 A1 | 2/2014 | Schulz et al. |
| 2014/0175340 A1 | 6/2014 | Choi et al. |
| 2014/0178671 A1 | 6/2014 | Dreezen et al. |
| 2015/0060742 A1 | 3/2015 | Glicksman et al. |
| 2015/0203694 A1 | 7/2015 | Glicksman et al. |
| 2015/0243812 A1 | 8/2015 | Hardin et al. |
| 2015/0275062 A1* | 10/2015 | Kim ..................... C08K 3/04 252/75 |
| 2016/0225926 A1 | 8/2016 | Schmitt et al. |

FOREIGN PATENT DOCUMENTS

| | | |
|---|---|---|
| TW | 201243865 | 11/2012 |
| WO | 2009032429 A1 | 3/2009 |
| WO | 2013036510 A1 | 3/2013 |
| WO | 2013090570 A1 | 6/2013 |
| WO | 2013158857 A1 | 10/2013 |
| WO | 2014174984 A1 | 10/2014 |
| WO | 2016099562 A1 | 6/2016 |

OTHER PUBLICATIONS

Translation of DE 10 2011 104 396.
Zhu, "Coating different thickness nickel-boron nanolayers onto boron carbide particles," Surface & Coatings Technology 202 (2008) 2927-2934. (Available online Dec. 3, 2007).
A. Ebong, N. Chen, "Metallization of crystalline silicon solar cells: A review", High Capacity Optical Networks and Enabling Technologies (HONET), 2012 9th International Conference on Dec. 12-14 pp. 102-109. DOI: 10.11091/HONET.2012.6421444.
Aihua Wang, "High Efficiency PERC and PERL Silicon Solar Cells," A thesis submitted to the University of New South Wales in fulfilment of the requirements for the degree of Doctor of Philosophy. Nov. 1992
Chandrasekaran, "20% n-Type Silicon Solar Cell Fabricated by a Simple Process with an Aluminum Alloy Rear Junction and Extended Emitter," Presented at the 43rd IEEE Photovoltaic Specialists Conference, Jun. 5-10, 2016, Portland, OR.
D. L. Meier, E. A. Good, A. Garcia, B. L. Bingham, S. Yamanaka, V. Chandrasekaran, C. Bucher, "Determining components of series resistance from measurements on a finished cell", Proc. 4th World Conf. PVSEC, vol. 2, pp. 1315-1318, 2006. DOI: 10.1109/WCPEC. 2006.279656.
D. L. Meier, H. P. Davis, R. A. Garcia, J. A. Jessup, A. F. Carroll, "Self-doping contacts to silicon using silver coated with a dopant

(56) References Cited

OTHER PUBLICATIONS source." Proc. IEEE Photovoltaic Specialists Conf., pp. 69-74, 2000. DOI: 10.1109/PVSC.2000.915755.
Davis, K. O., et. al. "Manufacturing metrology for c-Si module reliability and durability Part II: cell manufacturing." Renewable and Sustainable Energy Reviews 59 (2016) 225-252. DOI: 10.1016/j.rser.2015.12.217.
F. Sirotti et al., Nickel-based air-firable thick-film conductors, Journal of Materials Science, 1990, pp. 4688-4693, vol. 25, USA.
Goodrich, A., et. al. "A wafer-based monocrystalline silicon photovoltaics road map: Utilizing known technology improvement opportunities for further reductions in manufacturing costs." Solar Energy Materials and Solar Cells 114 (Jul. 2013): 110-35. DOI: 10.1016/j.solmat.2013.01.030.
Halm, A., et. al., "The Zebra Cell Concept—Large Area n-Type Interdigitated Back Contact Solar Cells and One-Cell Modules Fabricated Using Standard Industrial Processing Equipment", Proc. the 27th EU Photovoltaic Specialists Conference, pp. 567-570, (2012). DOI: 10.4229/27thEUPVSEC2012-2AO.2.1.
International Search Report and Written Opinion of the International Searching Authority for PCT/US2014/043521, dated Dec. 23, 2014.
International Search Report for International application No. PCT/US14/43521.
K.Y. Lin et al., Synthesis of Invay alloy powders by electroless plating, Material Science and Engineering A, 2006, pp. 226-231, vol. 416, USA.
Karabacak, T., et. al. "Stress reduction in tungsten films usuing nanostructured compliant layers." J. Appl. Phys. 2004, 96 (10), 5740-5746. DOI: 10.1063/1.1803106.
Kholostov, K. et. al. "Electroplated nickel/tim solder pads for rear metallization of solar cells." IEEE J. Photovolt. 6 (2) 2016, p. 404-411. DOI: 10.1109/JPHOTOV.2015.2506408.
M. Amirjan et al., Preparation of tungsten base composite powder by electroless nickel plating, Powder Metallurgy, 2010, pp. 218-222, vol. 53, No. 3, USA.
N. Hedgecock et al., On the Structure and Electrical Properties of Electroless N—B Films, Journal of the Electrochemical Society, 1975, pp. 866-869, vol. 122, No. 7, USA.
D. Schmitt, D. Eberlein, C. Ebert, M. Tranitz, U. Eitner, H. Wirth. "Adhesion of Al-metallization in ultra-sonic soldering on the Al-rear side of solar cells." Energy Procedia, 38 (2013), pp. 380-386. DOI: 10.1016/j.egypro.2013.07.293.
PCT/US2014/071608 International Search Report and Written Opinion of the International Search Authority dated May 14, 2015.
Popovich, Vera (2013). "Microstructure and Mechanical Aspects of Multicrystalline Silicon Solar Cells" (Doctoral dissertation). (Retrieved from private correspondence).
Rauer, M. (2015). "Alloying from Screen-printed Aluminum Pastes for Silicon Solar Cell Applications" (Doctoral dissertation). (Retrieved from http://www.ub.uni-konstanz.de/a-z/d-e/dissertationen/)).
Saga, T. "Advances in crystalline silicon solar cell technology for industrial mass production." NPG Asia Mater. 2, 96-102 (2010). doi: 10.1038/asiamat.2010.82.
Schneller, E. J., et. al. "Manufacturing metrology for c-Si module reliability and durability Part III: module manufacturing." Renewable and Sustainable Energy Reviews 59 (2016) 992-1016. DOI: 10.1016/j.rser.2015.12.215.
Search Report for PCT/US/2014/071608, dated May 14, 2015.
Snowdon D., et. al. "Composite curved laminates for the UNSW sunswift II solar array." In: Proceedings of solar world congress; 2001.
Wang, A. (1992). "High efficiency PERC and PERL silicon solar cells" (Doctoral dissertation). (Retrieved from http://www.unsworks.unsw.edu.au).
WO2014174984_MachineTranslation.
International Search Report for PCT/US2016/048098 dated Nov. 16, 2016.

* cited by examiner

CORE-SHELL, OXIDATION-RESISTANT, ELECTRICALLY CONDUCTING PARTICLES FOR LOW TEMPERATURE CONDUCTIVE APPLICATIONS

CROSS-REFERENCE TO RELATED APPLICATIONS

This application claims priority to U.S. Provisional Patent Application 62/209,545, filed Aug. 25, 2015 and to U.S. Provisional Patent Application 62/377,261, filed Aug. 19, 2016, both of which are incorporated by reference herein.

STATEMENT OF GOVERNMENT SUPPORT

The invention described and claimed herein was made in part utilizing funds supplied by the National Science Foundation under contract number IIP-1430721. The Government has certain rights in this invention.

BACKGROUND OF THE INVENTION

Field of the Invention

This invention relates to electrically-conductive adhesives, and more specifically to electrically-conductive adhesives that are resistant to corrosion that require low temperature processing conditions.

In general, electrically-conductive adhesives (ECA) contain a metal filler, a curable resin, and a curing agent, all mixed into a solvent. ECAs are increasingly used in printed circuit board and other sensitive electronic devices due to their high conductivities and ease of application versus solder adhesives. Silver particles, especially with a flattened flake shape, are the most commonly employed metal filler due to its high conductivity and resistance to corrosion. However, the price of silver particles is prohibitively high for many applications. As a result, alternative metal fillers have been proposed, such as copper, aluminum, and nickel. While metals other than silver can achieve low bulk resistivity, they all suffer from gradual corrosion-specifically oxidation—from the ambient, which compromises the conductivity of the electrical element due to the formation of insulating surfaces.

One approach to adapting conductive, but easily oxidized metals for ECA applications has been to coat less expensive yet conductive base-metal particles with silver to create a core-shell particle. The silver shell must be completely conformal to provide sufficient oxidation resistance for the underlying metal. If the coating is nonconformal, bimetallic corrosion may occur in regions where both the core and shell materials are exposed to the cured resin matrix. The coating thickness which has been empirically found to be acceptable is 200-500 nm. However, this silver coating thickness can comprise 30-50 wt % of the conductive metal filler used in ECA, which makes this solution economically unfeasible.

There is a need for lowering the cost of electrically-conductive adhesives by identifying a replacement for the silver coating of conductive base-metal particles. This material is required to possess sufficient resistance to corrosion while minimizing the use of precious metals.

BRIEF DESCRIPTION OF THE DRAWINGS

Herein we describe an ECA with a metal filler that comprises a base-metal core particle with a conductive, oxidation-resistant shell and an optional conductive second shell, and optional silver particles. The foregoing aspects and others will be readily appreciated by the skilled artisan from the following description of illustrative embodiments when read in conjunction with the accompanying drawings.

SUMMARY

Figure 1:
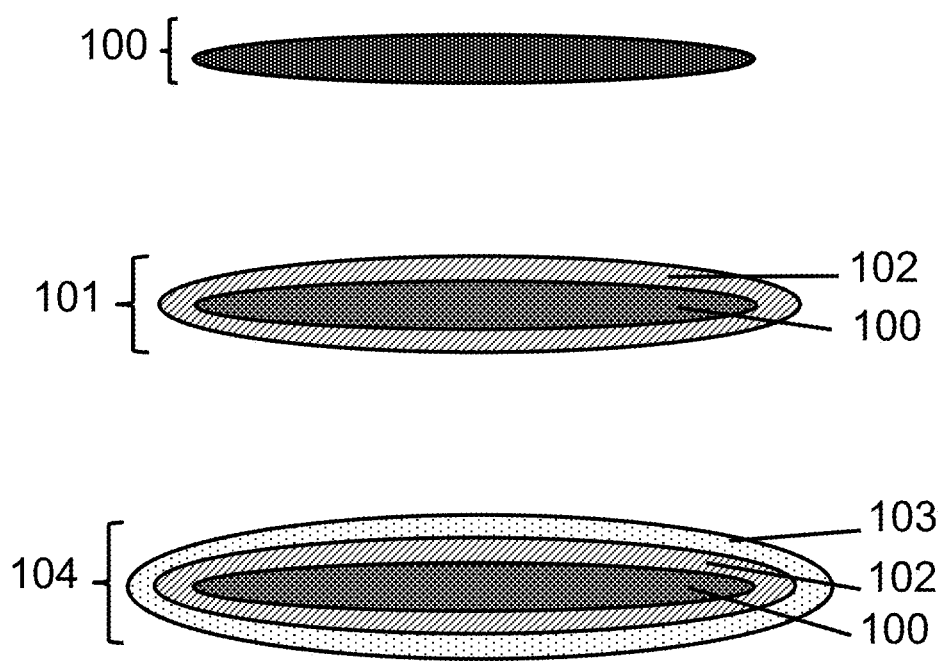
FIG. 1 is a schematic illustration that shows a core-shell metal particle, according to an embodiment of the invention.

In one embodiment of the invention, an electrically-conductive film is disclosed. The electronically-conductive film contains a plurality of oxidation-resistant core-shell metal particles, each of which includes a base-metal core particle and a first shell coating the base-metal core particle. The first shell may contain a nickel alloy. The electronically-conductive film also contains a plurality of silver particles. The core-shell metal particles and the silver particles are distributed throughout an organic matrix.

In another embodiment of the invention, another electrically-conductive film is disclosed. The electronically-conductive film contains a plurality of oxidation-resistant core-shell metal particles, each of which includes a base-metal core particle, a first shell coating the base-metal core particle, and a second shell coating the first shell. The first shell may contain a nickel alloy. The second shell may contain silver. The electronically-conductive film also contains a plurality of silver particles. The core-shell metal particles and the silver particles are distributed throughout an organic matrix.

In another embodiment of the invention, an electrically-conductive adhesive is disclosed. The adhesive contains a plurality of oxidation-resistant, core-shell metal particles, each of which includes a base-metal core particle and a first shell coating the base-metal core particle. The first shell may contain a nickel alloy. The electrically-conductive adhesive also contains a plurality of silver particles. The oxidation-resistant, core-shell metal particles and the silver particles are mixed together in an organic vehicle. The organic vehicle may contain a curable thermoplastic or thermoset resin, a curing agent or catalyst, and a solvent. In one arrangement, the base-metal core particle also has a second shell coating the first shell. The second shell may contain silver.

A description of the various particles in both the electronically-conductive film and the electronically-conductive adhesive and additional details about the electronically-conductive film (ECF) and electronically-conductive adhesive (ECA) follow.

The base-metal core particle may comprise any of aluminum, copper, tin, zinc, antimony, nickel, cobalt, magnesium, molybdenum, tungsten, tantalum, iron, and alloys, composites, and other combinations thereof. In one arrangement, the base-metal core particle material is nickel. In another arrangement, the base-metal core particle material is copper.

The oxidation-resistant core-shell metal particles may be spherical or approximately spherical. The oxidation-resistant core-shell metal particles may have a D50 between 100 nm and 100 µm or between 100 nm and 5 µm. The oxidation-resistant core-shell metal particles may have a unimodal or a bimodal size distribution.

The oxidation-resistant core-shell metal particles may have flake shapes that are 1-100 µm wide and less than 500 nm thick, 2-20 μm wide and less than 300 nm thick, or 2-5 μm wide and less than 200 nm thick, on average.

The nickel alloy of the first shell may contain less than 15 wt % of copper, tin, zinc, lead, bismuth, antimony, cobalt, iron, boron, phosphorus, magnesium, molybdenum, manganese, tungsten, tantalum, and composites, and other combinations thereof. The first shell may contain a nickel-boron alloy with a boron content between 0.1 and 10 wt %, between 1 and 8 wt %, or between 2 and 8 wt %. The nickel alloy of the first shell may be a nickel phosphorous alloy. The first shell may have a thickness less than 500 nm, less than 100 nm, or less than 20 nm.

The second shell may contain any of silver, copper, aluminum, tungsten, zinc, nickel, platinum, titanium, tin, gold, and alloys, composites, and other combinations thereof. The second shell may have a thickness less than 1000 nm, less than 100 nm, less than 50 nm, less than 10 nm.

The curable resin in the organic vehicle may include, but not limited to, epoxies, episulfides, maleimides, phenoxies, acrylics, siloxanes, rubbers, polyamides, polyimides, polyacrylates, polysulfones, polysiloxanes, polyesters, cyanoacrylates, polystyrenes, polyurethanes, and related chemical groups. The solvent in the organic vehicle may include, but not limited to, toluene, xylene, propylene carbonate, dimethyl carbonate, acetone, methyl ethyl ketone, methyl isobutyl ketone, ethanol, isopropanol, ethyl acetate, butyl carbitol acetate, and the like, and combinations thereof.

The oxidation-resistant core-shell metal particles and the silver particles together may make up between 5 and 75 wt %, between 10 and 75 wt %, or between 20 and 75 wt % of the electrically-conductive adhesive. The oxidation-resistant core-shell metal particles alone may make up between 5 and 75 wt %, between 10 and 75 wt %, between 20 and 75 wt % of the electrically-conductive adhesive. The silver particles alone may make up less than 30 wt %, less than 5 wt %, or less than 3 wt % of the electrically-conductive adhesive.

The electrically-conductive adhesive may have a viscosity between 10,000 and 100,000 cP or between 10,000 and 1,000,000 cP at 25° C. and at a sheer rate of 4 sec$^{-1}$ The electrically-conductive films disclosed herein may have thicknesses between 1 and 80 μm, between 1 and 20 μm, between 1 and 5 μm.

The oxidation-resistant core-shell metal particles and the silver particles together may make up between 5 and 75 wt %, between 10 and 75 wt %, between 20 and 75 wt % of the electrically-conductive film.

The oxidation-resistant core-shell metal particles alone may make up between 5 and 75 wt %, between 10 and 75 wt %, or between 20 and 75 wt % of the electrically-conductive film.

The silver particles alone may make up less than 30 wt %, less than 20 wt %, less then 10 wt %, less than 5 wt %, or less than 3 wt % of the film.

The hardened organic matrix in an electrically-conductive film may include crosslinked polymer resins.

The electronically-conductive films may have resistivities between 20 mΩ/sq/25 μm and 400 mΩ/sq/25 μm or between 20 mΩ/sq and 400 mΩ/sq. The electrically-conductive films may have a film hardness of at least HB, at least 2H, or at least 4H. The electrically-conductive film may exhibit no transfer during a tape x-hatch test.

DETAILED DESCRIPTION

The embodiments of the invention are illustrated in the context of an electrically-conductive adhesive (ECA) that is cured at low temperatures to form an electrically-conductive film (ECF). The skilled artisan will readily appreciate, however, that the materials and methods disclosed herein will have application in a number of other contexts where an easily applied conducting layer is desirable, particularly where low cost are important.

These and other objects and advantages of the present invention will become more fully apparent from the following description taken in conjunction with the accompanying drawings. All publications referred to herein are incorporated by reference in their entirety for all purposes as if fully set forth herein.

The following table lists some acronyms that are used throughout this patent application.

| Acronym | Meaning |
| --- | --- |
| ASTM | American Society for Testing and Materials |
| ECA | electrically-conductive adhesive |
| ECF | electrically-conductive film |
| ICP-OES-OES | inductively coupled plasma optical emission spectroscopy |
| ORCMP | oxidation-resistant core-shell metal particle |
| OV | organic vehicle |
| PET | polyethylene terephthalate |
| SEM | scanning electron microscopy |
| TGA | thermogravimetric analysis |
| XPS | x-ray photoelectron spectroscopy |

Electrically-Conductive Adhesives

The term "electrically-conductive adhesive" (ECA) describes a mixture of conductive metal filler and organic vehicle. Such an adhesive may be deposited onto substrates of electronic assemblies using solution processing techniques that include, but are not limited to, screen printing, gravure printing, spray deposition, slot coating, 3D printing, and inkjet printing. The term "low-temperature processing" describes processing as temperatures below about 400° C. for less than one hour. In exemplary embodiments, a deposited layer of ECA is heated to 120-140° C. for 2-10 minutes, or 10-30 seconds to form an electrically-conductive film (ECF).

The term "organic vehicle" (OV) describes the combined components of an ECA that are not solid. Constituents of an OV typically include, but are not limited to, commercially available resins, solvents, curing agents, hardening agents, viscosity modifiers, solvents, and other additives.

Conductivity in an ECF arises, at least in part, from the ability for current to flow through metal particles in contact with one another. Therefore, achieving the lowest possible contact resistance between metal particles is important. Oxidation or corrosion of the metal particles causes high contact resistance between particles and can drastically increase the overall resistance of an ECF. This phenomena also has implications for contact resistance between an ECF and a substrate to which it adheres, which is the resistance between, on the one hand, the mass of connected particles in the ECF and, on the other hand, the adhered substrate.

Conventional conductive metal fillers in ECAs are generally silver, although some dilute alloys, such as silver-palladium and silver-platinum, have been found to add useful functionalities. Typically, silver particles are used for their low resistivity and reliability even when exposed to air and moisture. Silver particles can have flake, sphere, nanowire, and dendrite morphologies. Another possible morphology is interconnected porous particles. The various particle morphologies can combined in various ratios as to maximize conductivity or some other desirable property. Flakes are especially useful due to their high number of interparticle contacts per mass of silver. A person with ordinary skill in the art would know how choose a particle morphology or combination of morphologies which maximizes conductivity for a given electrical assembly geometry and environment.

In one embodiment of the invention, oxidation-resistant core-shell metal particles (ORCMPs) are used as alternative metal fillers to replace silver particles in an ECA. An ORCMP is a base-metal core particle that is at least partially core-shell by at least one shell. The shell is oxidation resistant and includes a nickel alloy. The ORCMP may also have a second shell that may improve conductivity in an ECF made from such an ECA. The ORCMP experiences little or no shape or size change at typical processing and service conditions (approximately 50° C.-400° C.) or during standard accelerated aging testing. ORCMPs may utilize the same flake morphology for the purpose of maximizing conductivity per mass loading of a core base-metal and shell materials. Further details of ORCMPs are discussed below.

Various ECAs are formulated with ORCMPs as conductive fillers replacing at least a portion of silver particles. The ratios and selection of constituents may be determined by the application for which the adhesive is used. Exemplary applications include, but are not limited to, membrane touch switches, automotive conductors, sensors, RFID antennae, smart packaging, stretchable electronics, termination electrodes, biosensors, and in-mold electronics.

ORCMP Description

In one embodiment of the invention. ORCMPs have a core-shell morphology, with an oxidation-resistant shell coating a conductive base-metal particle, such that the core-shell particle retains its conductivity and oxidation resistance during low-temperature processing and accelerated aging conditions in the final ECF.

FIG. 1 is a schematic illustration that shows various stages in creating ORCMPs, according to some embodiments of the invention. A base-metal core particle 100 is made of a material such aluminum, copper, tin, zinc, antimony, nickel, cobalt, magnesium, molybdenum, manganese, tungsten, tantalum, or alloys, composites, or other combinations thereof. In one embodiment, the base-metal core particle 100 is nickel. In another embodiment, the base-metal core particle 100 is copper. The base-metal core particle may have a spherical, flake, filament or dendritic morphology. In various embodiments, the base-metal core particle 100 is a flake that is 2 to 20 µm wide and less than 300 nm thick, 1 to 100 µm wide and less than 500 nm thick, or 2 to 5 µm wide and less than 200 nm thick.

FIG. 1 shows a core-shell particle 101 in which the base-metal core particle 100 has a first shell 102. The first shell 102 may be oxidation-resistant. The first shell 102 coats the base-metal core particle 100. In one arrangement, the first shell 102 completely encapsulates the base-metal core particle 100. In another arrangement, the first shell 102 only partly encapsulates the base-metal core particle 100. In one embodiment of the invention, the first shell 102 contains a nickel-based alloy that is mostly nickel and includes less than 15 wt % copper, tin, zinc, lead, bismuth, antimony, cobalt, iron, boron, phosphorus, magnesium, molybdenum, manganese, tungsten, tantalum, or composites, or other combinations thereof. In various arrangements, the first shell 102 is a nickel-boron alloy with a boron content between 0.1 wt % and 10 wt %, between 1 wt % and 8 wt %, or between 2 wt % and 8 wt %. In another arrangement, the first shell 102 is a nickel-phosphorous alloy. The first shell 102 may have a thickness less than 500 nm, less than 100 nm, or less than 20 nm.

FIG. 1 shows a core-shell particle 104 in which the base-metal core particle 100 has a first shell 102 and a second shell 103. The second shell 103 coats the a first shell 102. In one arrangement, the second shell 103 completely encapsulates the first shell 102. In another arrangement, the second shell 103 only partly encapsulates the first shell 102. The base-metal core particle 100 and the first shell 102 have been described above. In one embodiment of the invention, the second shell 103 contains a highly conductive material that can help to minimize contact resistance between particles and ultimately lower ECF resistivity. In one embodiment of the invention, the second shell 103 contains silver, gold, platinum, copper, indium, tin, zinc, lead, bismuth, antimony, or composites, or other combinations thereof. In one arrangement, the second shell 103 is silver. The second shell 103 may have an average thickness less than 1000 nm, less than 100 nm, less than 50 nm, or less than 10 nm. The second shell 103 may be uniform or non-uniform in thickness. In one arrangement, the second shell 103 is discontinuous.

It can be useful to coat a base-metal core particle with two shells that cannot alloy with one another. A first shell may provide oxidation resistance. A second shell may provide good electric conduction. In an exemplary embodiment, the first shell is a nickel-boron alloy, and the second shell is silver. Nickel-boron and silver do not form alloys. It is useful to choose materials that are not susceptible to galvanic corrosion. If the first shell is nickel and the second shell is silver and does not completely coat the nickel first shell, galvanic corrosion can occur, especially if such core-shell particles are exposed to moisture.

The ORCMPs may be synthesized by a sequence of solution-phase chemical precipitations or by chemical vapor deposition in a chamber such as a fluidized bed reactor. An exemplary procedure for synthesizing a core-shell particle is to disperse a base-metal core particle in an aqueous solution containing the soluble salt of the desired metal species for the first shell. A reducing agent is then added, which precipitates reduced metal species onto the core particles, thus forming the first shell. Homogeneous nucleation of the material in solution is avoided by means of stabilizers and surfactants, which can also encourage conformal coating on the base-metal core particle. Subsequent shells of a different composition can be deposited in an analogous manner.

D50 is a common metric that is used to describe the median diameter of particles. The D50 value is defined as the value at which half of the particle population has a diameter below and half the particle population has a diameter above the value. Measuring a particle diameter distribution is typically performed with a laser particle size analyzer such as the Horiba LA-300. As an exemplary, spherical particles are dispersed in a solvent in which they are well separated and the scattering of transmitted light is directly correlated to the size distribution from smallest to largest dimensions. A common approach to express laser diffraction results is to report the D50 values based on volume distributions. It should be understood that the term "spherical shape" is used herein to mean an approximately spherical or equiaxed shape. Particles do not generally have perfect spherical shapes. In various embodiments of the invention, oxidation-resistant core-shell metal particles have an approximately spherical shape and have a D50 between about 100 nm-100 µm, or between 100 nm-50 µm. The statistical distribution of ORCMP sizes can also be measured using a laser particle size analyzer. It is common for ORCMP to have either unimodal or bimodal particle size distributions. Unimodal distribution can also mean that the particle size is monodispersed and the D50 would be in the center of the single distribution. Bimodal particle size distributions can increase the tap density of the ORCMP, which typically results in a higher green film density. D50 range can be used in conjunction with the modality to describe particle size distribution. In an exemplary embodiment, the ORCMP have a unimodal size distribution. In another exemplary embodiment, the ORCMP have a bimodal particle size distribution.

In another arrangement, the ORCMP have a flake, dendrite, or filament shape. In an exemplary embodiment, core-shell particles are flakes with diameters between 1-100 µm and less than 500 nm thick. In an exemplary embodiment, the oxidation resistance core-shell metal particles are flakes with diameters between 2-20 µm and less than 300 nm thick. In an exemplary embodiment, the oxidation resistance core-shell metal particles are flakes with diameters between 2-5 µm and less than 200 nm thick.

ORCMP Exemplary Embodiments

In an exemplary embodiment, a core-shell particle has a nickel core particle with a flake morphology. The flake is 10 µm wide and 100 nm thick. The nickel core has a first shell that is an alloy of nickel and boron (Ni:B) that contains between 2 and 8 wt % boron. The first shell is 5-50 nm thick and provides oxidation resistance. A method for the deposition of Ni:B on nickel particles is described in U.S. Pat. No. 9,331,216, which is incorporated by reference herein. If the first shell is too thin, the core particle may oxidize. If the first shell is too thick, it may cause an undesirable high bulk resistivity, which negatively impacts the conductivity of an ECF made from an ECA that contains such particles. It is useful to optimize the shell thickness to minimize core particle oxidation without negatively impacting overall conduction.

In another exemplary embodiment, a core-shell particle has a copper core particle with a flake morphology. The copper core has a first shell that is an alloy of nickel and boron (Ni:B) that contains more than two weight percent boron. If the Ni:B alloy has less than 2 weight percent boron, interdiffusion of copper from the core and nickel from the shell may degrade conductivity and other performance metrics. Although conductivity in Ni:B alloys decreases with increasing boron content, it is useful to include enough boron in the Ni:B of the first shell to ensure long-term stability of the core-shell particle.

In another exemplary embodiment, a core-shell particle has a nickel core particle with a flake morphology. The flake is 10 µm wide and 100 nm thick. The nickel core has a first shell that is an alloy of nickel and boron (Ni:B) that contains between 2 and 8 wt % boron. The first shell is 5-50 nm thick and provides oxidation resistance. There is a second shell over the first shell. The second shell is made of silver and is 10-25 nm thick. The second shell provides reduced contact resistance between core-shell particles in the hardened organic matrix of an ECF made from an ECA that contains such particles. This thickness of silver may not be sufficient by itself to reduce oxidation resistance. A method for silver coating of Ni:B core-shell nickel particles is described in U.S. Pat. No. 9,331,216, which is incorporated by reference herein.

In some embodiments, core-shell particles that have nickel core particles are used in applications that experience highly corrosive environments, applications that allow magnetization during curing to create anisotropic resistance, or applications that can tolerate high resistivity. In an exemplary embodiment a magnetic field is applied to an ECA incorporating ORCMP with nickel core flake particles during curing to orient the nickel flakes particles. The nickel flake particles may be oriented along their primary axes parallel with, perpendicular to, or in any other orientation to the substrate.

It can be useful to use ECAs that have ORCMPs with flake morphologies when flexible (non-rigid) substrates are used. ECFs made from such ECAs may be better adapted to maintain their conductivity even when bent as can happen with flexible substrates. ECFs made from ECAs that have spherical ORCMPs (even with roughened or spiky surfaces) can experience large increases in the resistivity even when bent only slightly.

Core-shell particles that have aluminum or copper core particles that have a first Ni:B shell, as described above, may be well-suited for high-conductivity applications and for relatively low-temperature (less than 200° C.) applications.

ORCMP Characterization

The composition of the first shell of an ORCMP can be determined using inductively coupled plasma optical emission spectroscopy (ICP-OES) that can be done with a Varian ICP-OES-OEM 720 Series. Briefly, this method begins by dissolving the ORCMPs in strong acid such as nitric acid. The ICP-OES instrument measures the optical emission spectrum of the sample solution. The weight percent is calculated by comparing the sample spectrum to those with known concentration of a target element (called "standard solutions"). The wt % of nickel in a nickel-boron shell can be determined when the core particle is a metal other than nickel, such as copper. This applies generally for any nickel alloy shell: the core particle must be selected so that it does not contain any metal in the shell alloy.

X-ray photoelectron spectroscopy (XPS) is another technique for measuring shell composition. XPS is a surface sensitive measurement that can directly probe the nickel alloy shell. Samples are prepared by depositing OCRMPs on to a conductive substrate. The substrate cannot have any element in the top 100 nm of its surface also included in the ORCMP. A preferred substrate is highly-doped silicon. The sample is loaded into an XPS instrument such as a PHI 5400 and spectra are measured using an aluminum or magnesium x-ray source powered to 100-350 W. Spectra can be analyzed using software such as CasaXPS to obtain elemental composition of the shell material.

ORCMP shape, size, shell texture, and shell conformality may be determine by a scanning electron microscope (SEM) such as a Zeiss Gemini Ultra-55 analytical field emission SEM. Samples of ORCMPs are prepared by depositing from a dilute solution of an appropriate and compatible solvent such as isopropanol onto a conductive substrate such doped silicon and dried in air for 30 mins. ORCMPs are imaged in the SEM using the InLens or SE2 detector and an accelerating voltage range of 1-10 kV and working distance of 3-10 mm.

Silver Particles

Silver particles may be added to electronically conductive adhesives and films in order to further reduce the electrical resistance. In an exemplary embodiment, the silver particles are spherical, quasi-spherical, equiaxed, or flake in shape. In various embodiments, the silver particles have a unimodal, or a bimodal size distribution. The silver particles may be micron-sized spheres with a D50 between 1 µm and 10 µm, between 1 µm and 5 µm, or between 1 µm and 2 µm. In an exemplary embodiment, the silver particles in the metallization paste are spherically shaped, nanoparticles with a D50 between 10 nm and 1 µm, or between 50 nm and 800 nm, or between 200 nm and 500 nm, or any range subsumed therein. In an exemplary embodiment, the silver particles are flakes with diameters between 1 and 100 µm and thicknesses between 100 nm and 1 µm.

ECAs Containing ORCMP Fillers

There can be numerous formulations for the ECA, which include ORCMPs, organic vehicle (OV), and optional silver particles. Each component is selected to have a specific weight percent (wt %). The term "solids loading" is used herein to describe the amount or proportion of solids in an adhesive, excluding organic matter such as curable resins and solvent. It should be understood that all the adhesives described herein include an organic resin, although that may not always be stated explicitly. Solids loading is identified as the weight percent (wt %) of solid material in the ECA.

The OV can be formulated with curable resins including, but not limited to, epoxies, episulfides, maleimides, phenoxies, acrylics, siloxanes, rubbers, polyamides, polyimides, polyacrylates, polysulfones, polysiloxanes, polyesters, cyanoacrylates, polystyrenes, polyurethanes, and related chemical groups. The average molecular weight of the curable resin polymer is 10,000 grams/mole or greater. The curable resin component can be between 5 and 95 wt %, or 10-80 wt %, or 50-70 wt % of the ECA. The resin may be chosen to be thermosetting, such that the film's viscosity and hardness increase due to thermally activated crosslinking of polymer chains. Alternately, the film may be chemically cured, such that addition of a curing agent or catalyst triggers similar crosslinking of polymers. The resin may be a thermopolymer, such that the adhesive's viscosity decreases upon heating past a glass transition temperature, followed by cooling and hardening to form a final electrically conductive film (ECF). A person with ordinary skill in the art would understand how to optimize the selection of the resin and its processing to achieve a desired viscosity and curing condition for a particular application. Common solvents include, but are not limited to, toluene, xylene, propylene carbonate, dimethyl carbonate, acetone, methyl ethyl ketone, methyl isobutyl ketone, ethanol, isopropanol, ethyl acetate, butyl carbitol acetate, and the like. In an exemplary embodiment, the solvent is a mixture of toluene and ethylene glycol diacetate.

The solid component of ECAs include ORCMPs, as described above, but may also include silver, copper, aluminum, tungsten, zinc, nickel, platinum, titanium, tin, and/or gold particles. Possible solid particle shapes include, but are not limited to, spheres or other equiaxed shapes, quasi-spheres, flakes, filaments, and dendrites. The loading of conductive filler in an electrically-conductive adhesive may be chosen with regard to the application for which the adhesive will be used. For example, a higher loading of conductive filler may yield an electrically-conductive adhesive with higher conductivity. In various embodiments, the solids include a combination of ORCMP and silver particles, and the solids loading is between 5 and 75 wt %, between 10 and 75 wt %, or between 20 and 75 wt % of the ECA. In various embodiments, OCRMP content in the ECA is between 5 and 75 wt %, between 10 and 75 wt %, or between 20 and 75 wt %. In various embodiments, the ECA has silver particles that make up less than 30 wt %, less than 20 wt %, less than 10 wt %, less than 5 wt %, or less than 3 wt % of the ECA.

In some embodiments, the ORCMPs conduct current isotropically. In other embodiments, the ORCMPs conduct current anisotropically (when particles in the ECA are aligned with an external magnetic field during the drying and curing process).

In various embodiments of the invention, the ECA has a viscosity between 50 and 1,000,000 cP at 25° C. and at a sheer rate of 4 sec$^{-1}$ or between 10,000 and 100,000 cP at 25° C. and at a sheer rate of 4 sec$^{-1}$ as measured using a temperature controlled Brookfield DV-II Pro viscometer.

ECFs Containing ORCMP Fillers

The term "electrically-conductive film" (ECF) describes any solid film that results from processing an ECA. In an exemplary embodiment, the ECA is applied to one surface of the electronics assembly and cured to form a passive component. In another embodiment, the ECA is applied between two conducting elements and cured under pressure, heat, or a combination thereof, to form an electrical connection. In some embodiments, the ECF thickness is between 1 and 80 µm, between 1 and 20 µm, or between 1 and 5 µm.

After curing the ECA, the ECF still contains all solid components, including OCRMPs and any other metal fillers (such as the optional silver particles described above), interspersed in a hardened organic matrix. In various embodiments, the solids loading in the ECF is between 5 and 75 wt %, between 10 and 75 wt %, or between 20 and 75 wt %. In various embodiments, the OCRMP loading in the ECF is between 5 and 75 wt %, between 10 and 75 wt %, or between 20 and 75 wt %. In various embodiments, the ECA has silver particles that make up less than 10 wt %, less than 5 wt %, or less than 3 wt % of the ECF. Electrical current passes through the solids in an ECF, so orientation of the ORCMPs may affect the conductivity of the ECF, especially if the ORCMPs have flake or dendrite shapes. In one embodiment, the longest dimension of the ORCMP is oriented parallel to the substrate plane. In another embodiment, the longest dimension of the ORCMP is oriented perpendicular to the substrate plane.

The term "organic matrix" describes the organic components in an ECF after the OV components of an ECA have been processed or cured. Curing processes include, but are not limited to, thermal and chemical treatment. Organic matrix components include, but are not limited to, cross-linked polymer resins and any additives that were not vaporized during the curing step.

ECAs are typically screen-printed onto a substrate such as a polymer film, core-shell paper, rigid epoxy, printed circuit board, or glass. In one arrangement, an ECA is deposited onto a polyethylene terephthalate (PET) substrate. In one arrangement, the deposited ECA is subsequently cured at a temperature between 120-140° C. for 2 to 10 minutes. In other arrangements, the deposited ECA is subsequently cured using UV light, lasers, microwaves, plasmas, or through chemical means.

Figure 2:
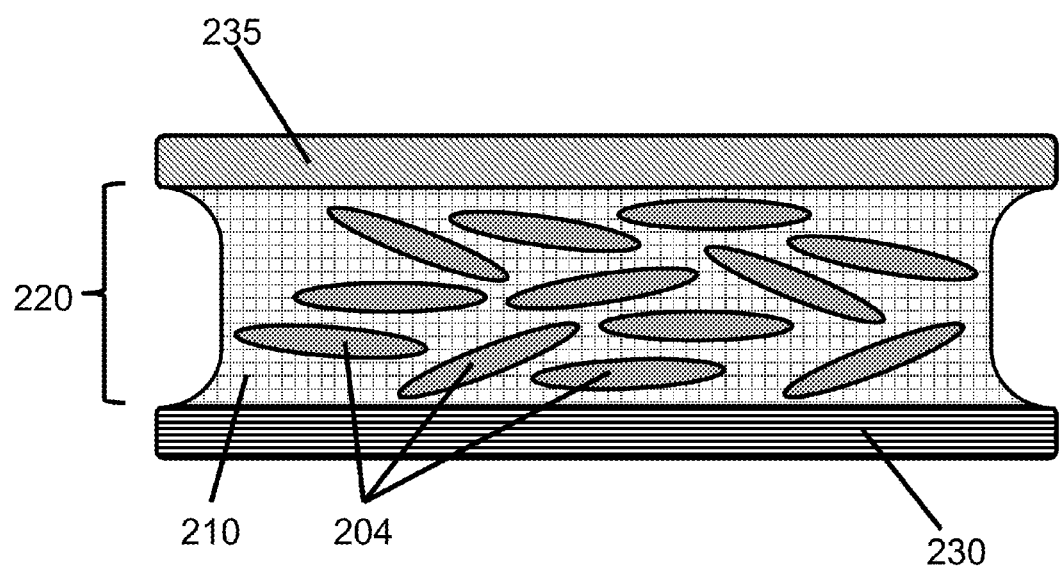
FIG. 2 is a schematic illustration of an electrically-conductive film that contains oxidation-resistant core-shell metal particles in an organic matrix, according to an embodiment of the invention.

FIG. 2 is a schematic illustration of an electrically-conductive film (ECF) 220 that contains oxidation-resistant core-shell metal particles (ORCMPs) 204, such as those shown as 101 or 104 in FIG. 1, in an organic matrix 210, according to an embodiment of the invention. The ECF 220 is shown between a first substrate 230 and a second substrate 235. One or both substrates 230, 235 may be stiff or flexible, as described above. In an exemplary embodiment, the substrates 230, 235 are PET. Electrical current may flow through the first substrate 230, through the ECF 220, and then through the second substrate 235. The bulk resistance of the ECF 220, the contact resistance between the ECF 220 and the substrate 230, and the contact resistance between the ECF 220 and the substrate 235 may all increase if the ORCMPs 204 become corroded. Electrical current may also be transported through the ECF 220 parallel to the substrates 230, 235. In some instances it may be advantageous to add silver particles (not shown) to reduce contact resistance between the ORCMPs 204. In various embodiments, the ECF 220 contains less than 30 wt %, less than 20 wt %, less than 15 wt %, less than 10 wt %, or less than 5 wt % silver particles.

ECF Characterization

The resistivity of the ECF describes the flow of current within the film is typically measured in milli-ohms-per square per-25 microns of film thickness (mΩ/sq/25 μm). Another metric is sheet resistance, which is total resistance divided by thickness with units mΩ-per-square (mΩ/sq). Both resistivity and sheet resistance can be measured using a Keithly 2400 and the four-point probe method as described in Schroder, D. K., "Contact Resistance and Schottky Barriers," in *Semiconductor Materials and Device Characterization*, pp. 134-157, Hoboken, N.Y.: John Wiley & Sons (2006).

The resistivity of the ECF can be tuned based on the metal filler content. In various embodiments of the invention, the ORCMP-based ECFs have a resistivity between 20 and 400 mΩ/sq/25 μm, between 50 and 200 mΩ/sq/25 μm, or between 50 and 100 mΩ/sq/25 μm. In general, desirable sheet resistances for conductive adhesive applications are between 20 and 120 mΩ/sq or between 50-80 mΩ/sq.

Given the lower cost of core-shell base-metal particles, it is possible to develop higher resistivity pastes that can be printed thicker to provide a similar resistance and therefore comparable performance. In exemplary embodiments, the sheet resistance of the ORCMP-based films is between 20 and 120 mΩ/sq for a thickness between 10 and 75 μm, between 10 and 50 μm, or between 10 and 25 μm. A person with ordinary skill in the art would know how to tune specific adhesive constituent quantities to attain appropriate values of resistance, viscosity, and adhesion in an ECA and its cured ECF.

Film hardness and adhesion are other important metrics for ECFs. Film hardness can be determined using the pencil scratch test according to ASTM standard 3363. Adhesion strength can be determined using the tape x-hatch test according to ASTM standard 3359. In various embodiments, the pencil hardness of an ECF, as described herein, is at least 4H, at least 2H, or at least HB. In one embodiment of the invention, there is no transfer of film residue during the tape x-hatch test on an ECF.

The term "accelerated aging" describes a common test of electrical device failure under heat and humidity. Such a test are performed in an "environmental chamber" such as an Espec BTX-475. Industry standards dictate exposing an electrical assembly to 85° C. and 85% relative humidity for between 50 and 1,000 hours without an encapsulant, or heating a film to 100° C. with 0% relative humidity for between 50 and 1,000 hours without an encapsulant. In various embodiments, the ECFs described herein show an increase in overall resistivity during accelerated aging of less than 30%, less than 15%, or less than 5%. In other embodiments of the invention, the ECFs described herein have less than 30%, 15%, or 5% increase in resistance when tested for 50 hours at 85° C. and 85% relative humidity without encapsulation.

ECF thickness and solids loading (OCRMP shape and size, optional metal particle filler shape and size) can be measured from scanning electron cross-section micrographs of ECFs on substrates. Samples were prepared by applying a thin epoxy layer to the exposed surface of the ECF and dried for at least 30 minutes. The sample was then transferred to a JEOL IB-03010CP ion mill operating at 5 kV and 120 uA for 8 hours to remove 80 microns from the sample edge. Cross-section images were imaged with a SEM such as a Zeiss Gemini Ultra-55 analytical field emission SEM using the InLens or SE2 detector and an accelerating voltage range of 1-10 kV and working distance of 3-10 mm.

The solids content (i.e., sum of the ORCMPs and silver particles) of the ECA and ECF can be measured using thermogravimetric analysis (TGA) on an instrument such as a TA Instruments Q5000IR, which measures mass loss percent as a function of temperature. The solids loading was determined by divided the remaining mass by the total mass. The fraction of the solids that are ORCMPs versus silver particles can be determined by taking the solid product and performing ICP-OES. It is possible to use TGA and ICP-OES to determine the weight loading of both the ORCMP and silver particles in both the electronically conducive adhesive and the film. As an example, an ECF is carefully detached from its substrate, ensuring that no substrate material is included in the ECF. The ECF is added to an aluminum pan and loaded into the TGA instrument. A recommended heating schedule is 25° C. to 600° C. at a heating rate of 10° C./min under air. The total solids loading (in weight percent) is determined by dividing the final mass from the starting mass. ICP-OES can be further used on the remaining product to determine the amount of ORCMPs versus silver particles in the solid, which is directly related to the solid content in the ECF.

Exemplary Embodiments

Some exemplary formulations for ECAs are shown in Table I.

TABLE I

| ECA formulations by weight % | | |
|---|---|---|
| Constituent | ECA A | ECA B |
| ORCMPs | 85 | 40 |
| Epoxy Resin | 5 | 20 |
| Solvent | 10 | 35 |
| Silver Particles | 0 | 5 |

ECA A: Nickel-Based ORCMPs

ECA A contains nickel-based ORCMPs. The base-metal core nickel flakes are 10 μm wide and 100 nm thick and are coated with two shells. The first shell contains an alloy of nickel and boron (2-8 wt %) and is 5-20 nm thick. The first shell is chemically precipitated by reaction of the nickel flake powder with 1M $NiCl_2$-$6H_2O$ and 0.1M dimethylamine borane in water at a temperature of 60° C. and pH=6. Due to the nature of the coating process, the resulting ORCMPs are smooth after coating. The second shell contains silver and is 10-25 nm thick. The second shell is chemically precipitated by reaction of the base-metal core nickel flakes that are already coated with the first shell with 0.2M Ag-succinimide complex and 0.05M hydrazine hydrate at 35° C. at pH=9. The resulting core-shell (with two shells) particle is mixed with a centrifugal mixer into a two-part curable epoxy resin and solvent, at a weight ratio of core-shell particles:epoxy resin:solvent of 85:5:10 to form an ECA. The ECA is then applied via screen printing and subsequently heated to 140° C. for ten minutes to form an ECF that has stable mechanical and electrical properties. In one arrangement, the ECA contains no additional metal particles. In another arrangement, the ECA contains less than 10 wt % silver particles. The resulting conductive film using the formula ECA A in Table I above has a resistivity between 20 mΩ/sq/25 µm and 400 mΩ/sq/25 µm, pencil hardness of 2H and there is no transfer of film residue during the tape x-hatch test.

ECA B: Copper-Based ORCMPs

ECA B contains copper-based ORCMPs. The base-metal core copper flakes are 2-3 µm wide and 100 nm thick and are coated with one shell. The shell contains an alloy of nickel and boron (2-4 wt %) and is 5-20 nm thick. The shell is chemically precipitated by reaction of the copper flake powder with 1M $NiCl_2$-$6H_2O$ and 0.1M dimethylamine borane in water at a temperature of 60° C. and pH=6. Due to the nature of the coating process, the resulting ORCMPs are smooth after coating. The resulting core-shell (with one shell) particle is mixed with silver particles using a centrifugal mixer into a two-part curable epoxy resin and solvent, at a weight ratio of core-shell particles:epoxy resin:solvent of 40:20:40 to form an ECA. The ECA is then applied via screen printing and subsequently heated to 140° C. for ten minutes to form an ECF that has stable mechanical and electrical properties. In one arrangement, the ECA contains no additional metal particles. In another arrangement, the ECA contains less than 10 wt % silver particles. The resulting ECF using the formula ECA B in Table I above has a resistivity between 20 mΩ/sq/25 µm and 400 mΩ/sq/25 µm, pencil hardness of 2H and there is no transfer of film residue during the tape x-hatch test.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrically-conductive film comprising:
   a plurality of oxidation-resistant, core-shell metal particles, each oxidation-resistant core-shell metal particle comprising:
   a base-metal core particle; and
   a first shell coating the base-metal core particle, the first shell comprising a nickel alloy; and
   a plurality of silver particles;
   wherein the core-shell metal particles and the silver particles are interspersed in an organic matrix.

2. The electrically-conductive film of claim 1, wherein base-metal core particle comprises a material selected from the group consisting of aluminum, copper, tin, zinc, antimony, nickel, cobalt, magnesium, molybdenum, tungsten, tantalum, iron, and alloys, composites, and other combinations thereof.

3. The electrically-conductive film of claim 1, wherein the oxidation-resistant, core-shell metal particles are spherical and have a D50 between 100 nm and 5 µm.

4. The electrically-conductive film of claim 1, wherein the oxidation-resistant, core-shell metal particles have flake shapes that are 1-100 µm wide and less than 500 nm thick, on average.

5. The electrically-conductive adhesive of claim 1, wherein the nickel alloy contains less than 15 wt % of a metal selected from the group consisting of copper, tin, zinc, lead, bismuth, antimony, cobalt, iron, boron, phosphorus, magnesium, molybdenum, manganese, tungsten, tantalum, and composites, and other combinations thereof.

6. The electrically-conductive film of claim 1, wherein the nickel alloy comprises a nickel-boron alloy with a boron content between 0.1 and 10 wt %.

7. The electrically-conductive film of claim 1, wherein the first shell has a thickness less than 500 nm.

8. The electrically-conductive film of claim 1, wherein the oxidation-resistant, core-shell metal particles comprise between 5 and 75 wt % of the electrically-conductive film.

9. The electrically-conductive film of claim 1, further comprising a second shell coating the first shell, the second shell comprising silver.

10. An electrically-conductive adhesive comprising:
    a plurality of oxidation-resistant, core-shell metal particles, each oxidation-resistant, core-shell metal particle comprising;
    a base-metal core particle; and
    a first shell coating the base-metal core particle, the first shell comprising a nickel alloy;
    a plurality of silver particles; and
    an organic vehicle, comprising:
    a curable resin;
    a curing agent; and
    a solvent;
    wherein the oxidation-resistant, core-shell metal particles and the silver particles are mixed together in the organic vehicle.

11. The electrically-conductive adhesive of claim 10, wherein base-metal core particle comprises a metal selected from the group consisting of aluminum, copper, tin, zinc, antimony, nickel, cobalt, magnesium, molybdenum, tungsten, tantalum, iron, and alloys, composites, and other combinations thereof.

12. The electrically-conductive adhesive of claim 10, wherein the oxidation-resistant core-shell metal particles are spherical and have a D50 between 100 nm and 100 µm.

13. The electrically-conductive adhesive of claim 10, wherein the oxidation-resistant core-shell metal particles have flake shapes that are 1-100 µm wide and less than 500 nm thick, on average.

14. The electrically-conductive adhesive of claim 10, wherein the first shell comprises a nickel alloy that contains less than 15 wt % of a metal selected from the group consisting of copper, tin, zinc, lead, bismuth, antimony, cobalt, iron, boron, phosphorus, magnesium, molybdenum, manganese, tungsten, tantalum, and composites, and other combinations thereof, and the balance being nickel.

15. The electrically-conductive adhesive of claim 10, wherein the first shell is less than 500 nm thick.

16. The electrically-conductive adhesive of claim 10, wherein the oxidation-resistant, core-shell metal particle further comprises a second shell coating the first shell, the second shell comprising a metal selected from the group consisting of silver, copper, aluminum, tungsten, zinc, nickel, platinum, titanium, tin, gold, and alloys, composites, and other combinations thereof.

17. The electrically-conductive adhesive of claim 16, wherein the second shell is less than 1000 nm thick.

18. The electrically-conductive adhesive of claim 10, wherein the oxidation-resistant core-shell metal particles and silver particles comprise between 5 and 65 wt % of the electrically-conductive adhesive.

19. The electrically-conductive adhesive of claim 10, wherein the silver particles comprise less than 30 wt % of the electrically-conductive adhesive.

20. An electrically-conductive film comprising:
a plurality of oxidation-resistant core-shell metal particles, each oxidation-resistant core-shell metal particle comprising:
   a base-metal core particle;
   a first shell coating the base-metal core particle, the first shell comprising a nickel alloy; and
   a second shell coating the first shell, the second shell comprising silver; and
silver particles;
wherein the core-shell metal particles and the silver particles are mixed together in an organic vehicle.

21. The electrically-conductive film of claim 20, wherein base-metal core particle comprises a material selected from the group consisting of aluminum, copper, tin, zinc, antimony, nickel, cobalt, magnesium, molybdenum, tungsten, tantalum, iron, and alloys, composites, and other combinations thereof.

22. The electrically-conductive adhesive of claim 20, wherein the nickel alloy contains less than 15 wt % of a metal selected from the group consisting of copper, tin, zinc, lead, bismuth, antimony, cobalt, iron, boron, phosphorus, magnesium, molybdenum, manganese, tungsten, tantalum, and composites, and other combinations thereof.

23. The electrically-conductive film of claim 20, wherein the nickel alloy comprises a nickel-boron alloy with a boron content between 0.1 and 10 wt %.

24. The electrically-conductive film of claim 20, wherein the first shell has a thickness less than 500 nm.

25. The electrically-conductive film of claim 20, wherein the second shell is less than 1000 nm thick.

26. The electrically-conductive film of claim 20, wherein the oxidation-resistant core-shell metal particles and the silver particles comprise between 5 and 65 wt % of the electrically-conductive film.

27. The electrically-conductive film of claim 20, wherein the silver particles comprise less than 30 wt % of the film.

* * * * *